United States Patent [19]

Delatte

[11] Patent Number: 5,226,715

[45] Date of Patent: Jul. 13, 1993

[54] BASKET FOR ARRANGING INDIVIDUAL BOXES AND CRYOGENIC CONTAINER

[75] Inventor: Daniel Delatte, Saint Maur, France

[73] Assignee: L'Air Liquide, Societe Anonyme pour L'Etude et L'Exploitation des Procedes Georges Claude, Paris, France

[21] Appl. No.: 928,044

[22] Filed: Aug. 11, 1992

[30] Foreign Application Priority Data

Aug. 30, 1991 [FR] France .................................. 9110781

[51] Int. Cl.⁵ ............................................. A47B 88/00
[52] U.S. Cl. ........................ 312/330.1; 292/DIG. 49; 292/87
[58] Field of Search ................ 312/330.1, 333, 334.47, 312/209, 215, 261, 334.14, 245, 248, 250; 292/DIG. 49, 80, 87, 246; 24/499

[56] References Cited

U.S. PATENT DOCUMENTS

| | | | |
|---|---|---|---|
| 358,006 | 2/1887 | Darrow | 292/246 |
| 418,672 | 1/1890 | Banker | 292/250 |
| 512,766 | 1/1894 | Tubach | 292/80 |
| 944,513 | 12/1909 | Selden | 312/333 |
| 1,380,188 | 5/1921 | Burritt | 321/330.1 |
| 2,437,451 | 3/1948 | Baird | 312/330.1 |
| 2,632,684 | 3/1953 | Anderson | 312/245 |
| 2,926,978 | 3/1960 | Mitchell | 312/330.1 |
| 4,425,012 | 1/1984 | Kley | 312/245 |
| 4,665,713 | 5/1987 | Delatte | 62/382 |

Primary Examiner—Kenneth J. Dorner
Assistant Examiner—Janet M. Long
Attorney, Agent, or Firm—Young & Thompson

[57] ABSTRACT

A basket for arranging individual boxes in a cryogenic bath, comprises a vertically elongated body (1) of substantially U-shaped transverse cross section having an open access face (6), a plurality of horizontal transverse dividers (8A, 8B) to support boxes (2), and manually actuable locks for locking the boxes in position in the basket. The locks (9) each comprises a principal portion (10) and an end portion (11) mounted pivotably about a substantially vertically axis on a lateral portion (3B) of the body (1). Each lock is displaceable elastically between a stable locking position in which the principal portion (10) extends across the access face (6), and a stable unlocking position freeing the access face. A cryogenic container (20) receives at least one such basket supported by hooking over a neck (24) of the container (20).

12 Claims, 2 Drawing Sheets

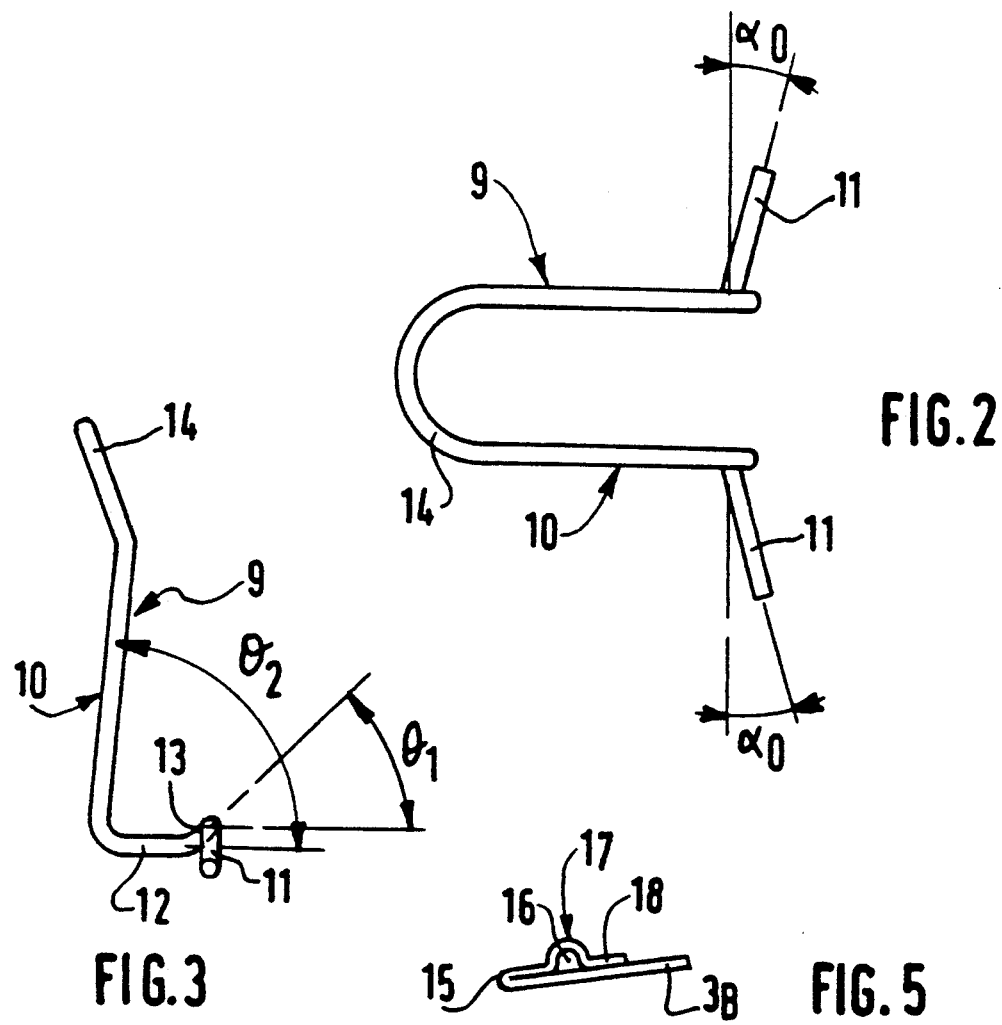
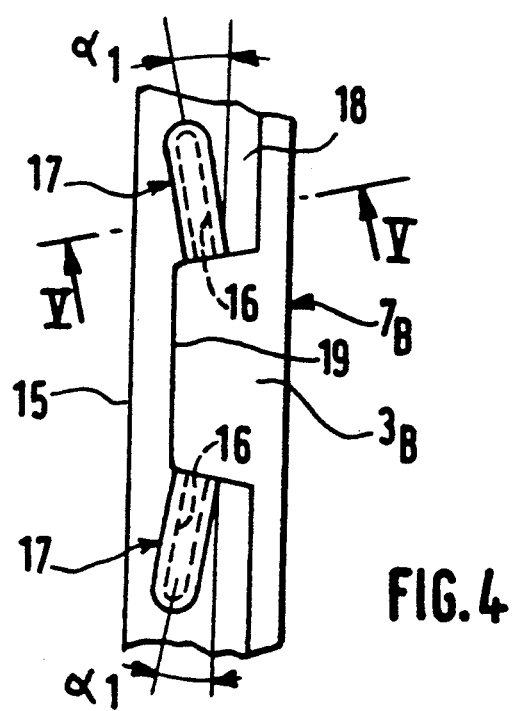
FIG. 2
FIG. 3
FIG. 5
FIG. 4

BASKET FOR ARRANGING INDIVIDUAL BOXES AND CRYOGENIC CONTAINER

FIELD OF THE INVENTION

The present invention relates to baskets for arranging individual boxes, particularly so-called "cryoplastic" drawers, of the type comprising a vertically elongated body of substantially U-shaped cross section with an access face for the introduction of the boxes, a plurality of elements comprising transverse dividers to support the boxes, and manually actuable means for securing the boxes in position in the basket.

BACKGROUND OF THE INVENTION

Baskets of this type are used particularly in cryogenic containers or cryopreservers for the storage at very low temperature, in a cryogenic fluid, of biological products. The locking means are usually constituted by a rod threadable into a series of aligned holes formed in the transverse dividers so as to extend like a bolt in front of the forward surfaces of the drawers disposed in the basket. This arrangement has drawbacks with regard to the transverse dividers bridging the access face, of having to provide perfectly aligned holes and of presenting difficulties of threading the rod into the different holes, particularly in the lowermost transverse dividers of the basket. There has also been proposed individual locking means for each basket, constituted by a handle swingably mounted by its ends in the side walls of the box and displaceable between a lower position, in which the handle stands in front of the front face of a drawer and a raised position freeing the drawer for passage through the access face. This arrangement however has the drawback of not having any stable or blocked position in the locked or unlocked position and so occupying both hands of the user.

OBJECTS OF THE INVENTION

The present invention has for its object to provide a new arrangement of basket comprising improved locking means, of simple and reliable structure and low cost of manufacture and assembly, guaranteeing the maintenance of a drawer in locked position, with application to the drawer of a yieldable force, and occupying a stable unlocking position.

The invention also has for its object a cryogenic container comprising at least one basket according to the invention, provided with means to hook over the access opening of the container.

SUMMARY OF THE INVENTION

To do this, according to a characteristic of the invention, the locking means are constituted by individual locks comprising a principal portion and an end portion mounted pivotally about a substantially vertical axis along a side portion of the body, and yieldably displaceable between a locking position in which the principal portion extends in front of the access face, and a stable unlocking position freeing the access face.

According to another characteristic of the invention, the end portion of each lock is constituted by two metal wire tongues diverging outwardly and each forming, in its rest position, a first angle relative to the vertical, the lateral portion of the body comprising two recesses receiving the tongues and each forming with the vertical a second angle in a direction opposite to that of the first angle of the corresponding tongue.

According to other more particular characteristics of the invention, the lock assembly is produced from a resilient metal wire and the body is obtained by cutting out and shaping a metallic flange, the recesses for the tongues of the lock being formed by an edge of the sheet bent outwardly along one lateral side of the body.

BRIEF DESCRIPTION OF THE DRAWINGS

Other characteristics and advantages of the present invention will become apparent from the following description of embodiments given by way of illustration but not limiting, referring to the accompanying drawings, in which:

FIG. 2 is a plan view of a lock according to the invention;

FIG. 3 is an elevational view of the lock of FIG. 2;

FIG. 4 an enlarged view of a basket edge showing the pivoting recesses for a lock according to FIGS. 2 and 3;

FIG. 5 a transverse cross sectional view on the line V—V of FIG. 4; and

DETAILED DESCRIPTION OF THE INVENTION

Figure 1:
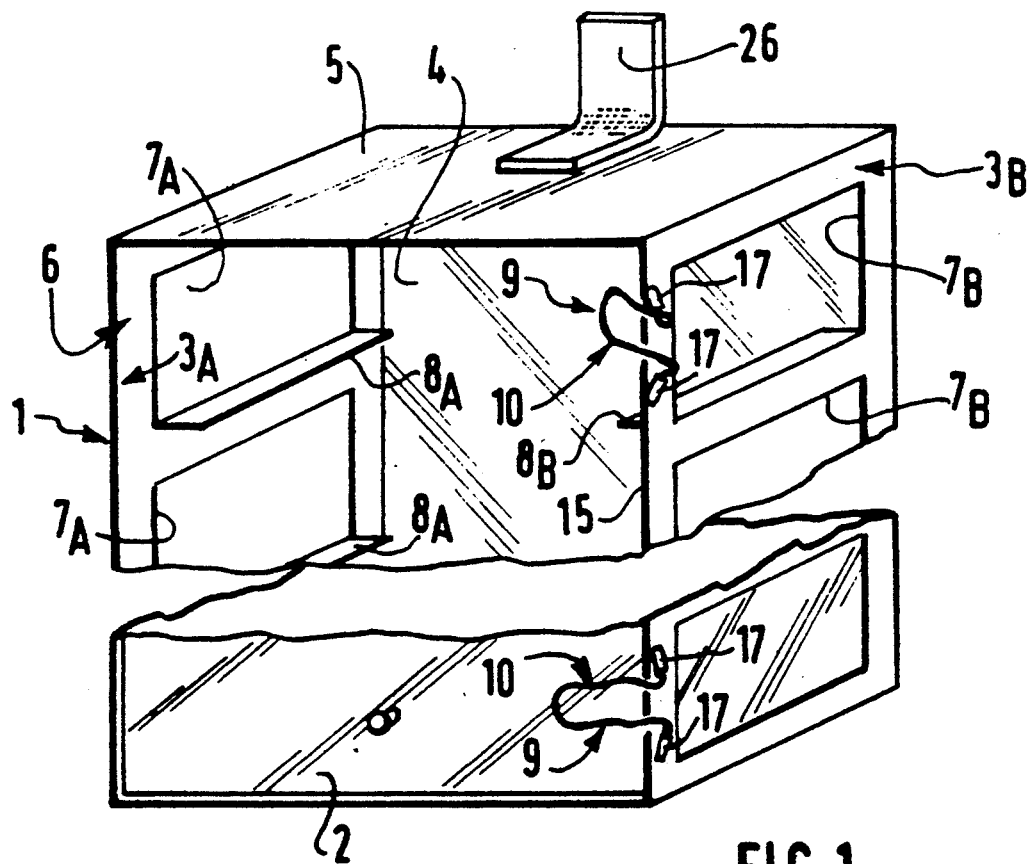
FIG. 1 is a fragmentary schematic perspective view of an arranging basket according to the invention.

In the description which follows and in the drawings, identical or analogous elements have the same reference numerals.

In FIG. 1, there is shown a basket or rack 1 for the arrangement of individual parallelepipedal boxes 2. The basket is preferably formed by cutting out and bending sheet metal, for example stainless steel, so as to have the shape of a vertically elongated body of substantially U-shaped transverse cross section, with lateral walls 3A, 3B, a vertical back wall 4, an upper end wall 5 and a lower end wall defining thereby an internal volume accessible through a forward access face 6. The lateral walls 3A and 3B are formed with a series of cutouts 7A, 7B, a portion of the wing of each cutout 7 being bent inwardly to form a plurality of transverse horizontal confronting divider elements 8A, 8B, to support the various boxes 2, which latter are for example of polyamide.

According to one aspect of the invention, the means for locking in position the boxes 2 in the basket 1 comprise, for each box recess, at least one lock 9 mounted on a side wall 3B so as to pivot about a substantially vertical axis between an unlocking configuration shown at the top of FIG. 1 and a locking configuration shown at the bottom of FIG. 1.

As will be better seen in FIGS. 2 to 5, each lock 9, preferably made of resilient metal wire of a diameter of about 1.8 mm, comprises a principal portion 10 adapted in the locking configuration to extend across the access face, and an end or mounting portion constituted by two end tongues 11 extending in a same plane and diverging outwardly relative to the principal portion 10 and each forming, in rest position, an angle $\alpha_0$ relative to the vertical, typically of about 15°. More specifically, the principal portion 10 has a U shape and is connected to the tongues 11 by a first transverse portion 12 orthogonal to the plane of the tongues 11 and a second portion 13 extending reversely, in the direction toward the principal portion 10, forming with the first portion 12 an angle $\theta_1$ of about 45°. To guarantee resilient contact of the lock 9 against the drawer in locking position, the principal portion 10 forms with the transverse portion 12 an angle $\theta_2$ less than 90°, for example between 80° and 85°. Similarly, to facilitate the actuation of the lock, the principal portion 10 comprises a free end 14 angularly offset outwardly relative to the principal plane of the principal portion 10.

The side wall 3B comprises, adjacent its forward edge 15 delimiting the access face 6, two recesses 16 to receive the tongues According to one aspect of the invention, each recess 16 extends in a direction forming with the vertical an angle $\alpha_1$ in the direction opposite to angle $\alpha_0$ of the corresponding tongue, the angle $\alpha_1$ being typically about 10° for an angle $\alpha_0$ of about 15°. In this way, the tongues 11 are forcibly engaged in the recesses 16 in which they pivot also responsive to force, thanks to their elasticity. The pivoting of the lock takes place about a substantially vertical axis and overcomes, in one or the other direction, an elastic force due to the torsion of the tongues within the recesses 16, such that the lock is maintained stably in an unlocked position and also stably in a locked position, thanks to the configuration of the principal portion 10, which exerts on the adjacent drawer an elastic force in the active locking position.

According to one aspect of the invention, as shown in FIGS. 4 and 5, the recesses 16 are constituted by a substantially cylindrical conforming portion 17 of a sheet edge 18 bent outwardly on the side wall 3B, which comprises locally a cutout 19 for positioning a tool for forming the recesses 16 during pressing the bent edge 18 against the side wall 3B, in this case a V of metal wire of diameter slightly greater than that of the wire of lock 9.

Figure 6:
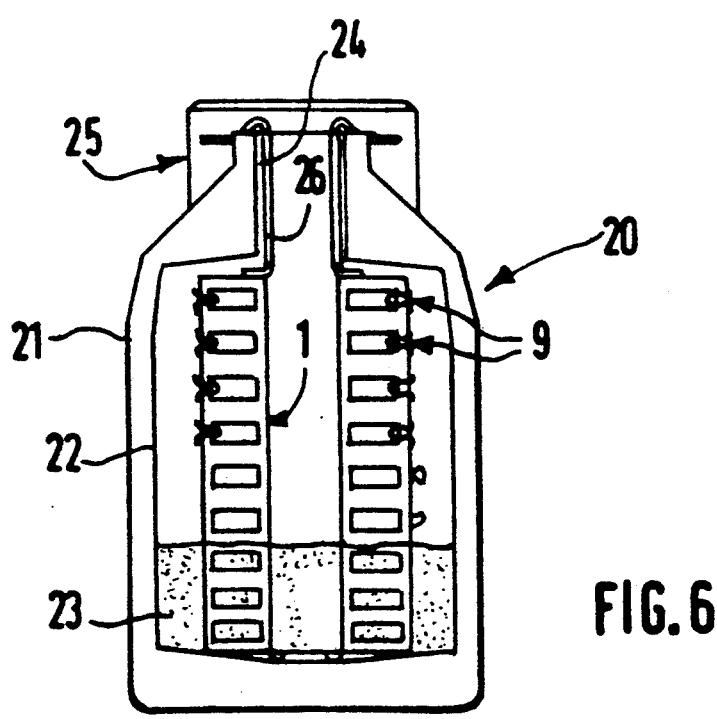
FIG. 6 is a longitudinal cross sectional schematic view of a cryogenic container enclosing baskets according to the invention.

There is shown in FIG. 6 a cryogenic container or cryopreserver 20 constituted in the usual way by an external container 21 and an internal container 22 adapted to contain a cryogenic fluid 23, for example liquid nitrogen. The internal container 22 has a neck 24 opening outwardly and closable by a cap 25. For supporting and emplacing in the container 20 the baskets 1, each of these latter comprises, at its upper portion, a positioning and maintenance member 26 permitting its hooking over the upper end of the neck 24, within the cap 25.

Although the present invention has been described in relation to a particular embodiment, it is not thereby limited but is on the contrary susceptible of modifications and variations which will be apparent to a person skilled in the art.

What is claimed is:

1. A basket for housing at least one box, comprising a vertically elongated body of substantially U-shaped transverse cross section defining an inner volume and having an open access face and opposed side faces, at least one transverse horizontal divider means extending in the inner volume for supporting the box and at least one manually actuable resilient lock for locking the box in position in the basket, said lock adapted to pivot around a substantially vertical axis and comprising a main portion and an end portion, said end portion being hingedly supported on one of said side face and said main portion extending in a cantilever manner from said end portion, said lock being resiliently movable by hand between a locking position wherein the main portion extends across at least part of the open access face of the basket and a stable unlocking position freeing the access face.

2. The basket of claim 1, wherein the end portion of the lock is constituted by two metallic wire tongues diverging outwardly and each forming, in an unstressed condition, a first angle in one direction relative to the vertical, said one side face being formed with two recesses each receiving a said wire tongue and forming a second angle in a second direction opposite to said one direction relative to the vertical.

3. The basket of claim 2, wherein said second angle diverges from the vertical in the direction towards the access face of the body.

4. The basket of claim 3, wherein said second angle is smaller than said first angle.

5. The basket of claim 2, wherein the lock is formed of a shaped metal wire having a loop portion forming at least part of the main portion.

6. The basket of claim 5, wherein at least the side faces of the body are formed from a blank of a sheet metal.

7. The basket of claim 6, wherein the recesses are formed by local deformation of the metal sheet.

8. The basket of claim 7, wherein the divider means are formed by facing inwardly bent portions of the metal sheet of the side faces extending into the inner volume.

9. The basket of claim 8, further comprising a back face formed from the blank of sheet metal.

10. The basket of claim 6, comprising a series of vertically spaced divider means for housing a series of boxes and a series of vertically spaced locks for individually locking the boxes in position in the inner volume.

11. The basket of claim 10, for use in a cryogenic container having an access neck, further comprising hooking means for suspending to the neck the basket in the container.

12. A cryogenic container containing a cryogen and at least one basket according to claim 11, housing at least one box.

* * * * *